United States Patent [19]

Jeschke et al.

[11] Patent Number: 4,681,455
[45] Date of Patent: Jul. 21, 1987

[54] METHOD OF DETERMINING THE AREA COVERAGE OF A PRINTED ORIGINAL OR PRINTING PLATE FOR PRINTING PRESSES

[75] Inventors: Willi Jeschke, Heidelberg; Helmut Kipphan, Schwetzingen; Gerhard Löffler, Walldorf, all of Fed. Rep. of Germany

[73] Assignee: Heidelberger Druckmaschinen AG, Heidelberg, Fed. Rep. of Germany

[21] Appl. No.: 805,573

[22] Filed: Dec. 4, 1985

Related U.S. Application Data

[63] Continuation of Ser. No. 499,212, May 31, 1983, abandoned.

[30] Foreign Application Priority Data

Mar. 16, 1982 [DE] Fed. Rep. of Germany ....... 3309443
May 29, 1982 [DE] Fed. Rep. of Germany ....... 3220361

[51] Int. Cl.$^4$ .............................................. G01B 11/28
[52] U.S. Cl. .................................. 356/445; 356/448; 356/380
[58] Field of Search ............... 356/380, 432, 433, 434, 356/435, 443, 444, 445, 446; 250/559, 562, 563, 571, 572

[56] References Cited

U.S. PATENT DOCUMENTS

| | | | |
|---|---|---|---|
| 3,053,181 | 9/1962 | Jorgensen | 356/445 X |
| 3,509,349 | 4/1970 | Molines et al. | 356/446 |
| 3,890,048 | 6/1975 | Abbondio et al. | 250/559 X |
| 3,958,509 | 5/1976 | Murray et al. | 250/559 X |
| 4,180,741 | 12/1979 | Palmatier et al. | 250/559 |
| 4,441,819 | 4/1984 | Takeuchi et al. | 356/445 X |

Primary Examiner—Davis L. Willis
Assistant Examiner—S. A. Turner
Attorney, Agent, or Firm—Herbert L. Lerner; Laurence A. Greenberg

[57] ABSTRACT

A measuring device which is equipped with a number of sensors determines the area coverage of a printing original or printing plate for printing presses. Each individual sensor of the measuring device is calibrated with the air of calibration strips. By means of an additional sensor of the measuring device, a printing-plate and/or printing-original-specific correction calibration and an adjustment to identical values of all sensors are provided. The correction calibration and adjustment are performed by way of a calibration field and a calibration area on the printing plate and/or printing original.

6 Claims, 7 Drawing Figures

METHOD OF DETERMINING THE AREA COVERAGE OF A PRINTED ORIGINAL OR PRINTING PLATE FOR PRINTING PRESSES

This application is a continuation of application Ser. No. 499,212, filed May 31, 1983, now abandoned.

The invention relates to a method of determining the area coverage of a printing original or printing plate for printing presses by means of a measuring device equipped with a number of sensors, in which each individual sensor is calibrated with the aid of at least one calibration strip with both minimum and maximum area coverage.

DESCRIPTION OF RELATED ART

A system for predetermining the settings for the ink zone adjusting screws on printing presses is known from U.S. Pat. No. 3,958,509. With the aid of an electronic camera the area coverage of two calibration plates, one for the 0% calibration and the other for the 100% calibration, is measured and these values are stored. In a further measuring operation the area coverage of the printing plate on hand is measured, and these measured values are brought into agreement with the measured values of the two previously measured calibration plates. Thereupon the corrected measured values are stored. The ink zone adjusting screws are set in accordance with these corrected measured values.

In addition, German Published Non Prosecuted Application No. (DE-OS) 29 50 606 describes a device for the zone-wise optoelectronic measurement of the area coverage of a printing original. The brightness distribution of a printing original is measured by recording elements and supplied to a computer which then supplies appropriate signals for setting ink zone screws.

A disadvantage of this system for predetermining the settings for the ink zone adjusting screws is that there is no automatic calibration of the measuring device in order to compensate for fluctuations of the illumination device and the receiver elements as well as of the entire analog electronics and the different reflection conditions of the plates to be measured. Furthermore, if the illumination is by means of fluorescent tubes, the fluctuation in intensity which depend on the line frequency has a very disadvantageous effect with regard to a sampling measuring run which should be as fast as possible. Moreover, this system is most inconvenient for the operator since it is difficult to take account of the different formats and plate types. Furthermore, the design solutions are usually very elaborate, expensive and complex with the result that the cost of their implementation bears no sound economic relation to the desired savings in waste and set-up times by presetting the inking control on the printing presses.

SUMMARY OF THE INVENTION

The object of the invention is to develop a method of determining the area coverage of printing plates, images of the printing plates, printed color separations, films etc., and thus to be able to calculate the respective ink requirement.

The techincal object of the invention is achieved by the characterizing clauses of claim 1.

The intention of the invention is to provide simpler operation and reproducibility when measuring area coverage profiles of printing originals. Furthermore, great flexibility is to be assured with regard to the type of printing originals and formats of printing originals which leads to considerable savings in cost. Moreover, reliable presetting of the press is obtained through the high accuracy.

A particular advantage which becomes apparent is the correction calibration by way of a special calibration field which is on the printing original in which several reference points in the calibration range area are sampled.

An advantageous evaluation takes place via the automatic status recognition which is composed of several components:
1. Verification of the presence, exact position and correct length of a calibration strip,
2. Detection of the calibration field of the printing plate and/or printing original, and
3. Interrogation as to the type and format of the printing plate and/or printing original.

To obtain high measuring accuracy and thus to improve the quality of the presetting, if there is no calibration area on the printing plate and/or printing original, the minimum and the maximum values of the area coverage of the printing plate and/or printing original are advantageously measured by the sensors of the measuring device, and a subsequent normalization to these values is made.

It is practical to design the measuring device so that inside there is an illumination device consisting of fluorescent tubes whole fluctuations of intensity in time are smoothed, as a result of which high measuring speeds can be obtained. The diffusion plates in front of the illumination device are for the improved, i.e. more homogeneous, illumination of the, e.g. ink-zone-wide areas of the printing plate. Disturbing glare effects can be suppressed by the use of polarization filters and diffusion films in the measuring head.

A preferred embodiment of the invention consists in that the receiving means are composed of sensors, and the signals of the individual sensors are supplied to an amplifier via a multiplexer for amplification and are digitized by an analog/digital converter for storage. Control and calculation functions are performed by a computer which is integrated in the control panel.

The safety rollers fitted to the measuring device are a particular advantage since they prevent any damage to the printing original which may possibly lie uneven.

Calibration field masks are provided to facilitate the making of the measuring field on the different types of printing plate.

BRIEF DESCRIPTION OF THE DRAWINGS

An embodiment of the invention will be explained with reference to the following drawings.

DESCRIPTION OF THE PREFERRED EMBODIMENTS

Figure 1:
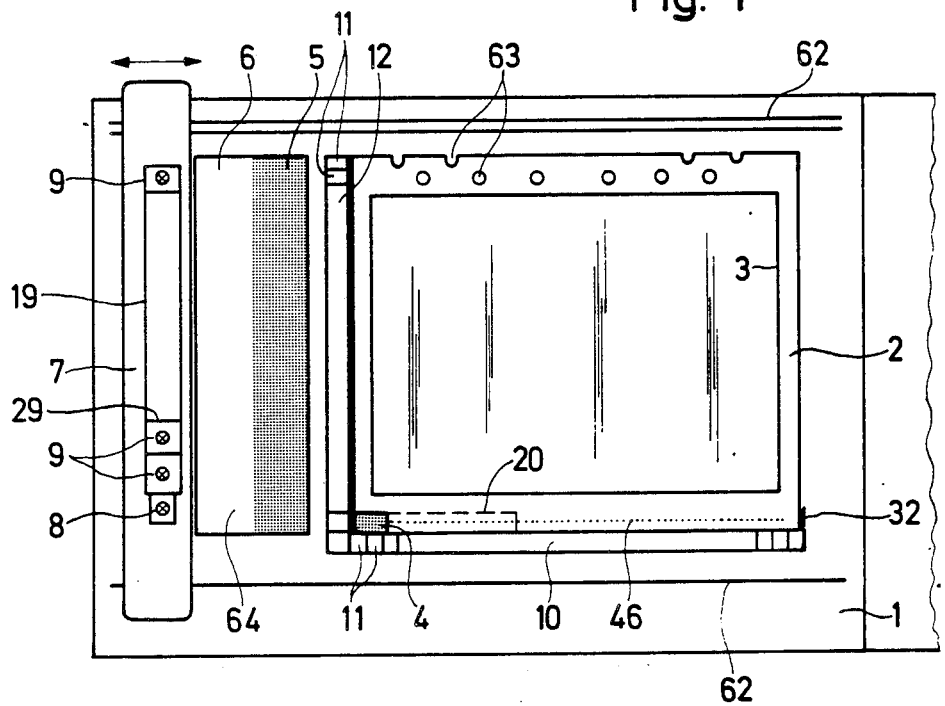
FIG. 1 shows an arrangement of the calibration strip and the printing plate on the printing plate support surface with the measuring device.

FIG. 1 shows the printing plate support surface 1 with the measuring device 7 which is attached thereto and which runs in guide tracks 62. On the printing plate support surface 1 there is a stop bar 10 which is at right angles to the scale strip 12. The horizontal stop bar 10 is, for example, divided into thirty-two measuring zones 11, corresponding to the ink duct zones of a certain press format, and the vertical scale strip 12 is, for example, divided into twenty-two measuring zones 11, corresponding to the number of sensors. The printing plate 2 with the register and clamping rail cutouts 63 is aligned at the stop bar 10 on the printing plate support surface 1 and is centralized with respect to the scales in the region of the printing plate 2. On the surface of the printing plate 2 are the ink-carrying surface 3 and the calibration field 4 as well as the calibration area 20 with the measuring track 46.

Furthermore, disposed on the printing plate support surface 1 left of the vertical scale strip 12 is the calibration strip 64 which is subdivided so that the left-hand field 6 is provided for the minimum calibration and the right-hand field 5 for the maximum calibration of the ink control.

Figure 2:
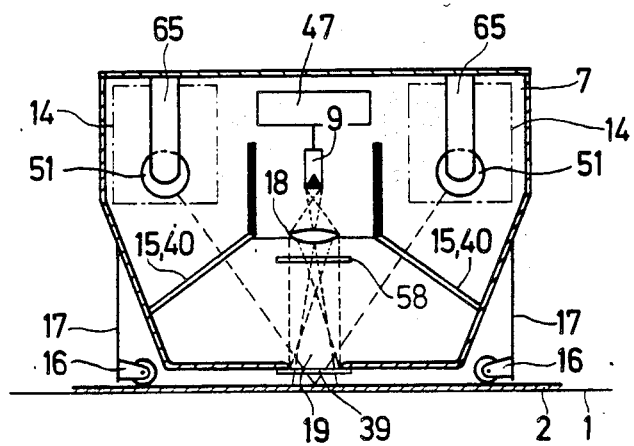
FIG. 2 shows a vertical section through the measuring device.

Inside the measuring device 7, as shown in FIG. 2, there are twenty-two sensors 9 and an additional sensor 8 which, in the course of a measuring run, determine the ink values of the calibration strip 64, the ink-carrying surface 3, the calibration field 4 and the calibration area 20 of the printing plate 2.

Inside the measuring device 7 there are illumination devices 14 with two fluorescent tubes 51 which are attached to holding devices 65. In the path of radiation of the fluorescent tubes 51 towards the printing plate support surface 1 there are diffusion plates 15 which may also be in the form of polarization filters 40. The sensors 9 are disposed above a focussing lens 18 directly over the measuring slit 19 and are coupled to matching electronic circuitry 47. Also in this path of rays are polarization filters 58 and dispersion films 39. The areas of the printing plate 2 and of the calibration strip 64 which are to be measured by the sensors 8 and 9 are determined by the measuring slit 19 and the partitions 29 of the light shafts. The measuring device 7 is driven by a motor (not shown) via a toothed belt and is guided in guide tracks 62. Disposed underneath the measuring device 7 are safety rollers 16 which are attached to it by means of brackets 17.

Figure 3:
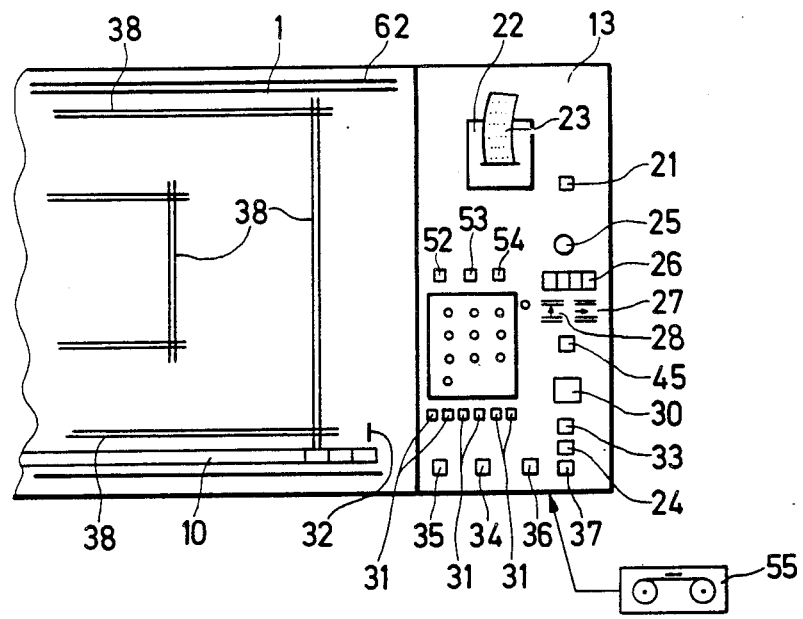
FIG. 3 shows the operator keyboard for the printing plate reader.

FIG. 3 shows the individual controls (output possibilities and information on operator control) 21 to 55 which are situated on the console panel 13 of the printing plate reader in order to perform the measuring operation. The process steps are performed, for example, in the following order:

The calibration strip 64, made preferably of the same material as the printing plate, is placed on the printing plate support surface 1 to the left of the printing plate 2. Thereupon the unit is put into operation by means of the on/off switch 25. With the aid of the button 30, a vacuum is set up in the area of the format-dependent vacuum slits 38 which are in the printing plate support surface 1.

This vacuum first of all draws in the calibration strip 64. The printing plate 2 is placed in position so that the register and clamping rail cutouts 63 are at the upper edge of the printing plate support surface 1 and are aligned with the stop bar 10 in such a way that the left-hand edge of the printing plate 2 is inside the first measuring zone 11 and is centered between the first and the final measuring zones. Aligning is made easier by line markings 32 for the nominal width of Heidelberger Druckmaschinen standard plates.

Thereupon a preselection is made of the desired output, log and reset modes by the operator by pressing the buttons for output selection 52, log selection 53 and reset selection 54. The operator can choose between a numeric, a graphic and a rest log. By means of the output button 24 the operator can have the log strip 23 printed out by the log printer 22.

The most important type of output of the printing plate reader is an automatically readable data carrier, e.g. a cassette 55. The measured values of a complete plate set can be stored on this cassette 55. This cassette 55 is then preferably read by an input unit in the control panel of the printing press. The data for the ink requirement are then converted into press presetting data.

The format of the printing plate 2 is set at the encoding switches 26 which are identified by the symbols for format width 27 and format length 28. Those figures are set which are covered by the printing plate 2 as it rests on the stop bar 10 and the scale strip 12. The format width which is set-in determines the travel of the measuring device 7. The format which is set at the encoding switches 26 is stored by pressing the format input button 45.

The color separation of the printing plate 2 is selected with the aid of the color separation selector button 31, e.g. black, cyan, magenta, yellow or X and Z for two additional colors. The suction air for the printing plate 2 is activated by means of the vacuum button 30, the suction air being limited to the vacuum slits 38 which are selected in dependence on the format. The measuring run is started by pressing the start button 33.

The measuring run begins with the measuring of the field 6 for minimum calibration and the field 5 for maximum calibration. This is followed by the measurement on the printing plate 2 beginning with the first measuring zone 11 up to that measuring zone which corresponds to the set format width of the printing plate 2.

The measuring device 7 glides back at increased speed over the printing plate support surface 1 to its starting point. After the output button 24 has been pressed, the selected output is initiated. It is also possible beforehand to measure further printing plates 2 with other color separations. The paper feed button 21 is for the paper feed of the log strip 23 on the log printer 22. Further functions which are useful to the operator are activated by the selective actuation of the emergency stop button 37, restart button 36 and cancelling button 35 (for color separation selection and/or calibration field switch-off). The special additional sensor 8 can be switched off via the calibration sensor switch-off button 34.

Figure 4:
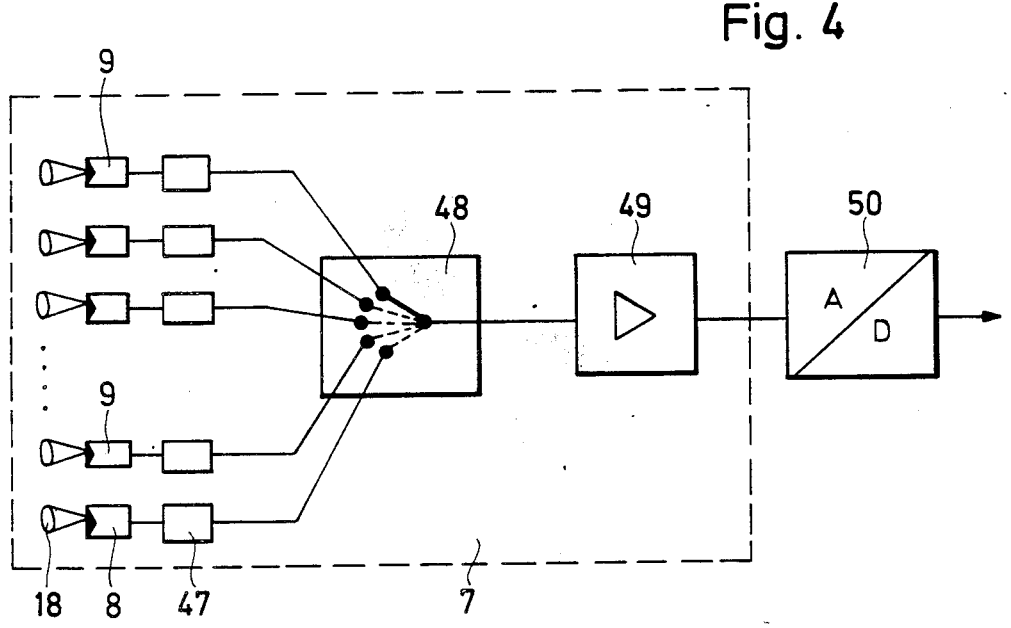
FIG. 4 shows the components of the measuring device.

FIG. 4 shows in diagrammatic form the flow of signals within the measuring device 7. The individual components are the focussing lenses 18, sensors 8 and 9, matching electronics 47, multiplexer 48 and amplifier 49. The measuring device 7 is driven by a motor (not shown) which is connected to a gear unit. By means, for example, of an inductive measuring pickup the basis is established for determining the position of the measuring device 7 on the printing plate support surface 1. The positions of the measuring device 7 are determined via a counter which accepts the pulse received by a pulse disc and via comparators. The measurements take place during the continuous run of the measuring device 7 over the printing plate support surface 1. The measured values are supplied to the A/D converter 50 which is contained in the processing electronics of the unit.

The light reflected by the printing plate 2 is received via focussing lenses 18 by sensors 8 and 9, processed by the matching electronics 47 and supplied via a multiplexer 48 to an amplifier 49 and then to an A/D converter 50. To make optimum use of the resolution of the A/D converter 50, the gain of the amplifier 49 is matched to the maximum signal of the sensors 9 on the field for minimum calibration 6 of the calibration strip 64. If the number of steps of the usable converter range falls below a minimum then the offset circuit of the amplifier 49 is changed via the measured values of the fields for maximum calibration 5 of the calibration strip 64. In the event of a reaction between offset setting and amplifier setting due to the circuit, the amplifier circuit is re-optimized. This may necessitate a new calibration run before the actual measuring run. In general, the calibration run and the measuring run run into one another, at any rate within a printing plate set after the first printing plate.

The individual sensors 8 and 9 are calibrated on the calibration strip 64. The additional sensor 8 determines the contrast ratios between calibration strip 64 and printing plate 2 via the calibration field 4 and the calibration area 20 on the printing plate 2. By means of special mathematical operations the previously established characteristics of the sensors 8 and 9 are matched to the conditions of the printing plate 2.

In an area coverage value less than 0 % is found in a measuring zone on the printing plate, then there is a calibration error as a result of defective calibration measuring areas. The minimum calibration is to be replaced by this value, i.e. the negative measured value is to be set equal to zero.

To have as low a difference as possible between the contrast ratios of the printing plate 2 and those of the calibration strip 64, the calibration strip 64 should be made of the same material as the printing plate 2. The different calibration strips 64 can be kept in a special calibration strip repository which is, for example, in the measuring console.

By means of a visual comparison between printing plate 2 and calibration strip 64 the printer should select the best possible calibration strip 64 and place it in the measuring position on the measuring console. This ensures that the receiving means are calibrated in the later operating range of the printing plate 2. In conjunction with the re-calibration this leads to optimum resolution and measuring accuracy. This is of particular importance if, owing to the possible absence of the calibration field 4 or a defective calibration area 20 and/or calibration field 4, the additional sensor 8 has to be switched off by pressing the calibration sensor switch-off button 34.

Figure 5:
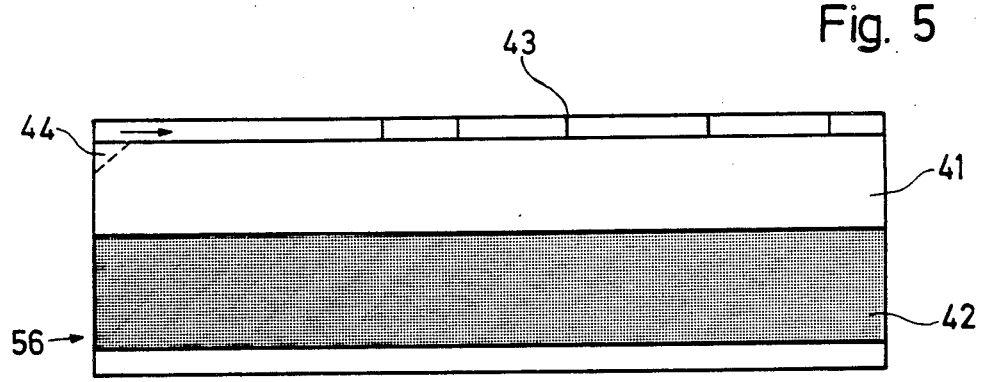
FIG. 5 shows a film for making the calibration strip.

FIG. 5 shows the film 56 for making the calibration strips 64. The two fields 41, 42 correspond to the minimum and maximum area coverage. The marking lines 43 are for trimming to the different plate lengths. The identification corner 44 of the film 56 is cut off, for instance, in the case of aluminum plates, and is retained in the case of multi-metal plates. When working without automatic plate-type recognition, a microswitch disposed in the printing plate support surface 1 in the region of the calibration strip 64 is actuated by the calibration strip 64, with the aid of which the type of plate is recognized.

Figure 6:
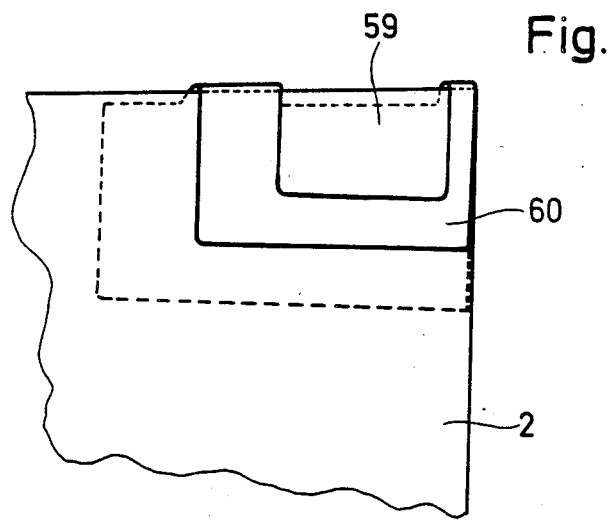
FIG. 6 shows a calibration field mask with window slipped over a negative plate (negative copy).
Figure 7:
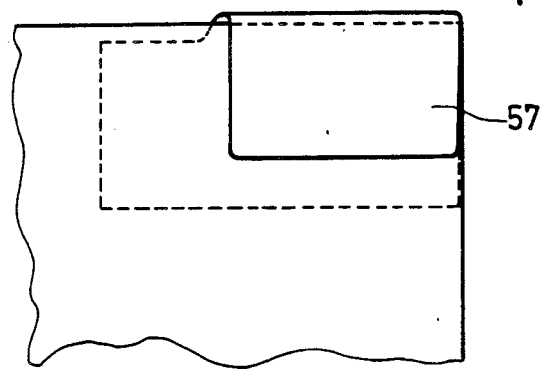
FIG. 7 shows a calibration field mask without window slipped over a positive plate (positive copy).

The calibration field mask 60 shown in FIG. 6 has a window 59 for the copy of the calibration field 4 in the case of negative copies. The calibration field mask 57 shown in FIG. 7 is used for making the calibration field 4 in the case of positive copies. The calibration field masks 57 and 60 are made of any material; calibration field masks made of sheet metal have proved particularly effective.

For the dimensionally correct copying of the calibration field 4 on the printing plate 2, the appropriate calibration field mask 57 or 60 is, in this special design, slipped over the right-hand top corner of the printing plate 2, i.e. at the end of printing since there are no holes there.

The copying of the calibration strip 64 in the printing direction of the plate is particularly important in the case of printing plates 2 with a pronounced direction of gloss (brushed, etc.). In principle, it would also be possible to integrate gloss-reducing measures within the measuring device 7, e.g. diffusion films 39 or the use of polarization filters 40 in the measuring slit 19 and/or in the illumination and receiver ray path. In contrast to aluminum printing plates, much light is reflected by the ink-carrying parts of the plate in the case of multi-metal printing plates. This makes it necessary for the measuring signal to be inverted. This is communicated to the unit either by automatic actuation of a special microswitch when the calibration strip is placed in position, or automatically by the above-described plate type recognition.

The additional sensor 8 is preferably of the type which can be switched off by means of the calibration sensor switch-off button 34 in case the calibration field 4 is defective or entirely missing.

In an embodiment which is different from the above-described input via encoding switches 26, it is also possible to specify the format automatically in that the jump in contrast from the printing plate support surface 1 to the printing plate 2 is measured by the sensors 9 in the vertical (plate length) direction and by the sensors 8 or 9 in the horizontal (plate width) direction.

The result of the measurement of the measuring device 7 are area coverages per zone. The area determined by the zone width and number of sensors serves as a basis in this connection. In general, the format-dependent printing length is not identical with this basic area. Therefore, an automatic correction of the measured value for normalization to to 100% is performed. This is done by multiplying the result by format-dependent, fixed factors.

These area coverage values do not yet permit the direct presetting of the inking control in the printing unit of a printing press. Depending on the type of press and the ink, the area coverage values must now be used to calculate the presetting of the ink duct (zone opening) and the ductor (ink strip width). This is done preferably in the control console of the printing press, but can, in principle, also be performed by the computer of the printing plate reader.

The use of a special presetting computer is also possible. By means of such a presetting computer with appropriate presetting programs it is possible to obtain the universal operation of all machines with presetting data insofar as they are in the format range. This presetting computer could also convert the zone spacings and zone widths which are dependent on the ink duct and are fixed-programmed in the printing plate reader, so that they can be used for other ink ducts.

From the area coverage data it is possible to calculate also the ink requirement per sheet, or in the case of web-fed presses, per section length by including the ink film thickness on the sheet. Thus, it is possible to estimate the ink requirement for the production run in advance.

There are claimed:

1. Method of determining area coverage of an original print or printing plate for printing presses by means of a measuring device equipped with a plurality of sensors with which each sensor, respectively, is calibrated with the aid of at least one calibration strip separate from the printing plate yet formed of the same material as that of the printing plate, the calibration strip having a respective minimum and maximum area coverage and having substantially similar surface conditions as those of the printing plate, which comprises performing a further correction calibration specific to the original print and printing plate, respectively, as well as an adjustment by identical correction values of all of the plurality of sensors by means of at least one of the sensors in the measuring device.

2. Method according to claim 1 which comprises performing the specific correction calibration and adjustment by means of a calibration field and a calibration region along a measuring track located on the printing plate and original print, respectively, by sampling at least one reference measuring point in the calibration field having the maximum area coverage and, in the calibration region along the measuring track, having the minimum area coverage.

3. Method according to claim 1 which comprises first performing an automatic status recognition by means of the measuring device, which verifies the presence and correct position of the calibration strip by checking the sequence of the areas with minimum and maximum area coverage.

4. Method according to claim 1, characterized by the feature that the format of the printing plate and/or printing original (2) is automatically determined by assessing the change in contrast between the printing plate support surface (1) and the printing plate and/or printing original (2).

5. Method according to claim 1, characterized by the feature that the minimum and the maximum measured values of the area coverage are determined without calibration field by one or more sensors (9) of the measuring device (7) on the printing original (2) itself; that all measured values are normalized to said values; and that area coverage is thus likewise determined in a manner specific to the printing original and/or printing plate.

6. Method according to claim 5, characterized by the features that the light of the measuring device (7) emitted by an illumination device (14) is reflected by the individual sections of the printing plate and/or printing original; that the reflected light is converted by the sensors (9) of the measuring device (7) into an analog signal corresponding to the area coverage; and that the signal is supplied via a multiplexer (48) and an amplifier (49) to an analog/digital converter (50) and is subsequently stored for further processing.

* * * * *

UNITED STATES PATENT AND TRADEMARK OFFICE
CERTIFICATE OF CORRECTION

PATENT NO. : 4,681,455
DATED : July 21, 1987
INVENTOR(S) : WILLI JESCHKE, HELMUT KIPPHAN and GERHARD LÖFFLER It is certified that error appears in the above-identified patent and that said Letters Patent are hereby corrected as shown below:

In the title page, item (3), line 18

"March 16, 1982 (DE) Fed. Rep. of Germany . . . 3309443"

should read:

- - March 16, 1983 (DE) Fed. Rep. of Germany . . . 3309443 - - .

Signed and Sealed this

Thirty-first Day of May, 1988

Attest:

DONALD J. QUIGG

*Attesting Officer*  *Commissioner of Patents and Trademarks*